US011533320B2

(12) United States Patent
Shravan et al.

(10) Patent No.: US 11,533,320 B2
(45) Date of Patent: Dec. 20, 2022

(54) OPTIMIZE COMPLIANCE EVALUATION OF ENDPOINTS

(71) Applicant: Pulse Secure, LLC, San Jose, CA (US)

(72) Inventors: Bandam Radha Shravan, Telangana (IN); Robert Koeten, Half Moon Bay, CA (US); Biju Kaimal, Bangalore (IN)

(73) Assignee: Pulse Secure, LLC, San Jose, CA (US)

( * ) Notice: Subject to any disclaimer, the term of this patent is extended or adjusted under 35 U.S.C. 154(b) by 345 days.

(21) Appl. No.: 16/808,967

(22) Filed: Mar. 4, 2020

(65) Prior Publication Data
US 2021/0281576 A1 Sep. 9, 2021

(51) Int. Cl.
*H04L 9/40* (2022.01)

(52) U.S. Cl.
CPC ........ *H04L 63/108* (2013.01); *H04L 63/0876* (2013.01); *H04L 63/102* (2013.01); *H04L 63/20* (2013.01)

(58) Field of Classification Search
CPC . H04L 63/108; H04L 63/0876; H04L 63/102; H04L 63/20
See application file for complete search history.

(56) References Cited

U.S. PATENT DOCUMENTS

| | | | |
|---|---|---|---|
| 7,437,568 B2 | 10/2008 | Das-Purkayastha et al. | |
| 7,590,684 B2 | 9/2009 | Herrmann et al. | |
| 7,774,824 B2 | 8/2010 | Ross et al. | |
| 8,010,842 B2 | 8/2011 | Krivopaltsev et al. | |
| 8,438,619 B2 | 5/2013 | Olson | |
| 8,539,544 B2 | 9/2013 | Garimella et al. | |
| 8,760,675 B2 | 6/2014 | Ozaki | |
| 8,763,077 B2 | 6/2014 | Oberheide et al. | |
| 8,990,891 B1 | 3/2015 | Chickering et al. | |
| 9,288,199 B1 | 3/2016 | Winn et al. | |
| 9,524,388 B2 | 12/2016 | Oberheide et al. | |
| 9,560,049 B2 | 1/2017 | Srinivasan | |
| 9,924,366 B2 | 3/2018 | Schmidt et al. | |
| 10,063,594 B2 | 8/2018 | Winn et al. | |
| 2004/0103310 A1* | 5/2004 | Sobel | H04L 63/105 709/223 |
| 2006/0074600 A1 | 4/2006 | Sastry et al. | |
| 2007/0239748 A1 | 10/2007 | Smith | |
| 2016/0088021 A1* | 3/2016 | Jayanti Venkata | H04W 4/50 726/1 |
| 2017/0141961 A1 | 5/2017 | Cao et al. | |
| 2017/0142157 A1 | 5/2017 | Cao et al. | |

(Continued)

OTHER PUBLICATIONS

European Search Report for Application No. 21160590.2-1213, dated Aug. 2, 2021, 3 pages.

*Primary Examiner* — Khoi V Le

(57) ABSTRACT

The techniques described herein relate to authorizing networked devices to access protected network zones and/or network resources in a private network. In response to a first access request, a network appliance requests full compliance information from the networked device. The received compliance information is stored in a database. Subsequently, when the compliance information on the networked device changes, the network device sends updated compliance information to the network appliance. The network appliance reevaluates the compliance state of the networked device based on the updated compliance information and the compliance information stored in the database.

17 Claims, 6 Drawing Sheets

(56) References Cited

U.S. PATENT DOCUMENTS

2018/0176254 A1 6/2018 Lam et al.
2018/0198786 A1 7/2018 Shah et al.
2019/0334921 A1 10/2019 Pattar et al.

* cited by examiner

OPTIMIZE COMPLIANCE EVALUATION OF ENDPOINTS

TECHNICAL FIELD

This disclosure relates to network devices, and in particular, access control for network devices.

BACKGROUND

Network control devices, such as Network Access Control (NAC) devices, Virtual Private Network (VPN) controllers, and Software Defined Perimeter (SDP) controllers, of private networks intercept end user requests for network access. In a typical private network environment, a network control device provides network access control for on-premise access requests. On-premise access requests are characterized as access requests that are receive through a network control device or access point that is considered part of the private network infrastructure. Conversely, off-premise access requests for access originate from network control devices or access points that are outside the private network infrastructure.

While on-premise access requests usually do not result in forming, for example, a VPN tunnel to authorize or authenticate an end user device, some of the private network infrastructure may include network control devices that are connected to the private network over a VPN tunnel and some of the on premise authorization and authentication activity may utilize VPN tunnels that are already part of the private network.

Conventional network control devices intercept network access requests and perform and/or manage identifying information checks (e.g., username and password checks and/or certificate checks) to authenticate a user and/or a device used by the user. That is, network control devices may perform authentication to determine whether the end user device and its user are authorized to use the network. Initial exchanges between the end user device and the network control device are typically over the data-link layer or layer 2 (L2) of the OSI model. If the end user device is authorized to access the private network, based on the authorization check performed by the network control device on L2, the network control device approves or authorizes the end user device limited access to the private network but only on L2.

While username and password authorization can be performed on L2, a policy compliance check of the end user device is generally performed at higher OSI model layer, e.g. L3 the L7. Thus, after authenticating a username and password, the network control device performs a compliance check of the end user device to determine if the end user device is in compliance with current policies of the enterprise network. The current policies may be stored on the network control device or on a separate policy server in communication with the network control device. If the end user device is found to be in compliance with current policies of the private network, the network control device grants the end user device a higher level of access (e.g., full access) to the private network. If the end user device is found not to be compliance with current policies, the network control device may deny the end user device access to the private network, or at least until the end user device has been brought into compliance, e.g., by providing the end user device with access to a remediation server or module to be used to bring the end user device into compliance.

The current policies may include, an acceptable operating system updated to a particular revision or other update state, an acceptable virus/malware/spyware protection program updated to a particular revision or update state, an agent module of the private network operating on the end user device wherein the agent module operates to evaluate a policy compliance state of the end user device, or the like, a firewall type and its settings, a browser type and its settings, or the like. Additionally or alternatively, the current policies may require that certain applications—plugins, add-ons, or the like—are not running on the end user device.

A conventional network control device associated with a private network may include an authorization module, or may outsource authorization to an authorization module operating on another device included other devices outside the private network infrastructure such as authentication server. Similarly, a conventional network control device associated with a private network may include a policy module and/or a policy authentication module, or may outsource policy authentication to an authentication module operating on another device included other devices outside the private network infrastructure such as authentication server.

Remote Authentication Dial-In User Service (RADIUS) is a conventional client/server protocol and software that enables remote access services, e.g., an end user device, to communicate with a central server, such as a network control device, to authenticate remote users and authorize their access to the requested system or server. The RADIUS protocol is widely used and is preferred by many private network administrators. The RADIUS protocol at least requires a point-to-point protocol (PPP) connection between the RADIUS client and the end user device, which at least requires establishing a network layer connection or a layer 3 (L3) connection on the Open System Interconnection (OSI) model.

The Extensible Authentication Protocol (EAP) and the Extensible Authentication Protocol over LAN (EAPOL), each defined in IEEE 802.1x, are conventional authorization and authentication protocols usable as an interface between an end user device and a RADIUS client to facilitate authorization and/or authentication of end user devices attempting to access a private network from a LAN and WLAN using the RADIUS protocol and/or a RADIUS server. One part of the authorization and authentication process of EAP and EAPOL is carried out over an L2 connection, and another part of the authorization and authentication process is carried out over an L3 connection. As a result, the authorization and authentication are conducted as two separate and unrelated events that are not tied together.

SUMMARY

In general, this disclosure describes techniques for determining whether to grant a user device access to a network. In one example, the user device initially provides authentication credentials to a network appliance, such as a Network Access Control (NAC) device, a Virtual Private Network (VPN) controller or a Software Defined Perimeter (SDP) controller, etc. The network appliance (or a server associated with the network appliance) requests compliance details from the user device based on the configured policies. In response to a request for specific compliance information, a client on the user device then sends the requested compliance information. In some examples, the client also stores the request and/or which compliance information is requested. Post a security posture evaluation, the network appliance either grants the user device with full network access or limits access along with sending remediation information to the user device to bring it into compliance with the policies. The network appliance stores the compliance information in a compliance database. Subsequently, from time to time, the network appliance requests for updated compliance information. The client determines which information has changed since the last request, and only sends the compliance information that has changed. The network appliance uses the updated compliance information and the compliance information on the compliance database to evaluates compliance of the user device.

In one example, a method includes, in response to receiving, by a network appliance, a first request to access a protected network resource from an endpoint device that includes a client software module configured to communicate with the network appliance, (a) determining which compliance information related to policies associated with a role that was granted as a result of the authentication that was performed earlier, (b) requesting all of the determined compliance information from the client software module (c) evaluating the compliance of the endpoint device based on the compliance information received from the client software module and providing access when the compliance information satisfies the policies, and (d) storing the received compliance information in a database associated with the network appliance. The example method also includes, in response to receiving, by the network appliance, a second request to access a protected network resource from the endpoint device, (a) accessing the compliance information of the endpoint device stored in the database, (b) requesting an update from the endpoint device, (c) in response to requesting the update, receiving updated compliance information that includes less than all of the compliance details required by the policies, (d) in response to receiving, by the network appliance, first updated compliance information that includes only updated ones of the compliance details required by the policies, evaluating the compliance of the endpoint device based on the updated compliance information and the compliance information stored in the database to determine an updated compliance state, and (e) providing access based on the updated compliance state.

In another example, a network appliance that enforces one or more policies for accessing a private network, the network appliance comprising at least one processor is configured to, in response to receiving a first request to access a protected network resource from an endpoint device that includes a client software module configured to communicate with the network appliance, (a) determine which compliance information related to policies associated with a role that was granted as a result of the authentication that was performed earlier, (b) request all of the determined compliance information from the client software module (c) evaluate the compliance of the endpoint device based on the compliance information received from the client software module and providing access when the compliance information satisfies the policies, and (d) store the received compliance information in a database associated with the network appliance. The network appliance is also configured to, in response to receiving a second request to access the protected network resource from the endpoint device, (a) access the compliance information of the endpoint device stored in the database, (b) request an update from the endpoint device, (c) in response to requesting the update, receive updated compliance information that includes less than all of the compliance details required by the policies, (d) in response to receiving, by the network appliance, first updated compliance information that includes only updated ones of the compliance details required by the policies, evaluates the compliance of the endpoint device based on the updated compliance information and the compliance information stored in the database to determine an updated compliance state, and (e) provides access based on the updated compliance state.

In another example, a method includes, in response to receiving, by a network appliance, a request to access a protected network resource from an endpoint device that includes a client software module configured to communicate with the network appliance, (a) determining whether a compliance database includes compliance information associated with the endpoint device, (b) when compliance database does not include the compliance information associated with the endpoint device, determining which of the compliance information related to policies associated with the protected network resource to request and requesting all of the determined compliance information from the client software module, and (c) when compliance database includes the compliance information associated with the endpoint device, accessing the compliance information of the endpoint device stored in the database and requesting an update from the endpoint device, and (d) evaluating the compliance of the endpoint device based on the compliance information received from the client software module and providing access when the compliance information satisfies the policies.

The details of one or more examples are set forth in the accompanying drawings and the description below. Other features, objects, and advantages will be apparent from the description and drawings, and from the claims.

DETAILED DESCRIPTION

Techniques are described that may provide technical solutions to the problem of reducing processing and bandwidth usage dedicated to ensuring policy compliance on a network. In a large private network, for example, many devices may connect to a network seeking to use protected resources, such as a network printer, a communications server for handling e-mail exchanges, fax communications, remote access to the network, firewalls and/or other internet services, and/or a database server for storing data and for managing requests to store or access data, etc. As described below, a network appliance cooperates with a client installed on a user device. When the user device first requests access to a private network, the network appliance requests a full set of compliance data from the user device. The network appliance evaluates the compliance to network policies based on the full set of compliance data. The network appliance provides access to the network bases on the compliance state of the user device. The network appliance then stores the full set of compliance data in a database. Based on the request, the client monitors the user device. For example, the client may monitor the versions and/or setting of applications of interest (e.g., an identity of an antivirus product, settings of the antivirus product, an identity of a firewall product, settings of the firewall product, an identity of a patch management product, settings of the patch management product, a status of an application, a presence of a file on the device, a status of one or more ports, and/or settings of registry keys, etc.). Subsequently, when a compliance check is to be performed, the network appliance requests updated compliance data. The client responds with the compliance data that has changed since the last compliance data request. The network appliance uses this update compliance data and the compliance data stored in the database to evaluate the compliance of the user device. In such as manner, for example, the network appliance and the client reduce the volume of data that is being transmitted over the network compared to traditional methods. The techniques described below may provide technical benefits to the network. By reducing the volume of information transmitted to evaluate compliance of user devices, for example, the techniques described below provide may reduce the time required access to the network. Additionally, because performing periodic compliance checks on a large number of devices can consume a lot of resources that can otherwise being used, the techniques described here may reduce network congestion and increase an amount of available network resources.

Figure 1:
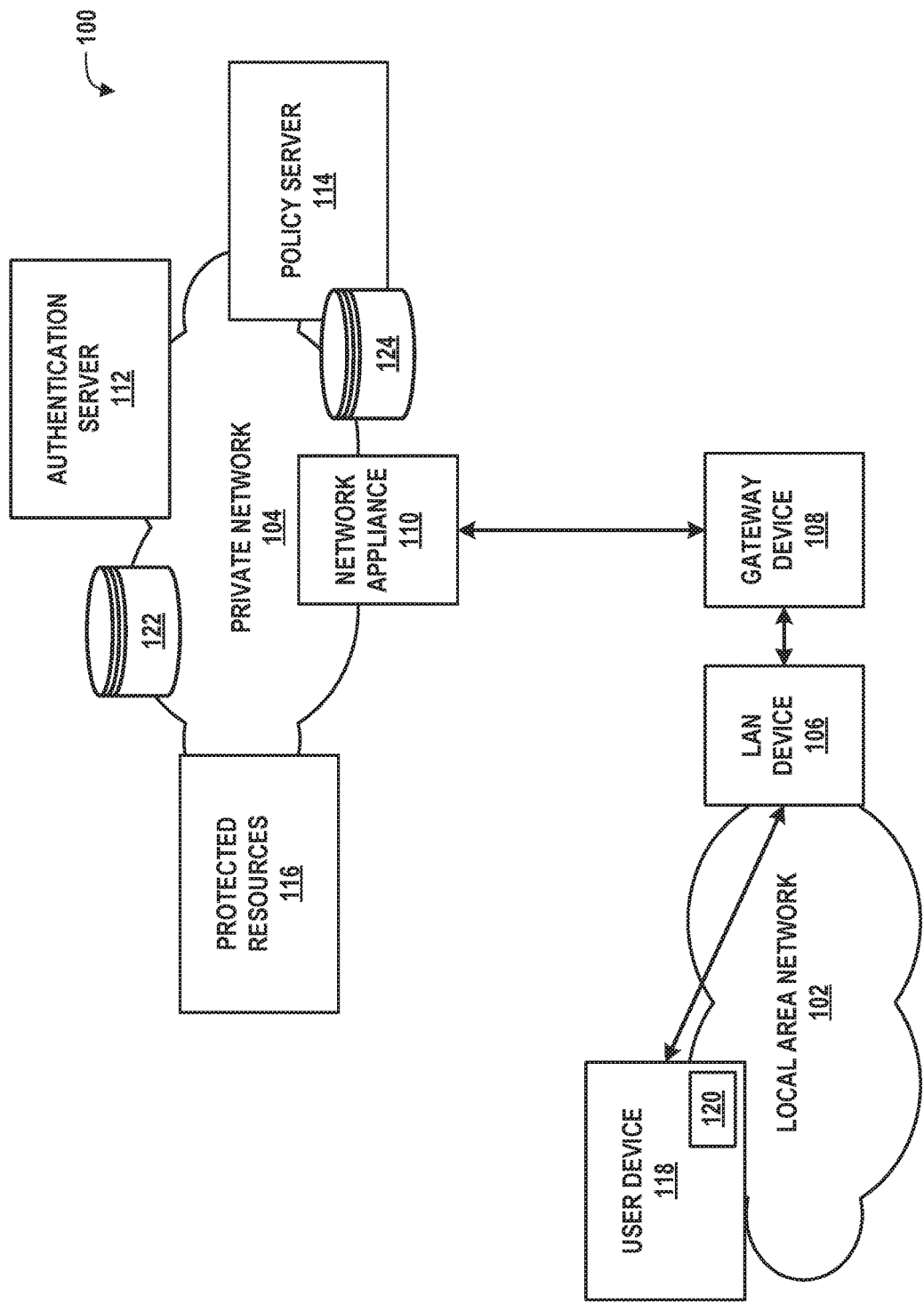
FIG. 1 is a block diagram illustrating an example network system including devices that may be configured to perform various techniques of this disclosure.

FIG. 1 is a block diagram illustrating an example network 100 including devices that may be configured to perform various techniques of this disclosure. The network 100 may, for example, represent an Intranet infrastructure. In the example of FIG. 1, the network 100 includes a local area network (LAN) 102 and a private network 104. In the illustrated example, network 100 includes network components 106-116 that facilitate access to the private network 104 by user device 118 executing a network client 120 (sometimes referred to as the "client") connected to the LAN 102. The user device 118 may be, for example, a personal computer device (e.g., a smartphone, a smart watch, a tablet, a laptop, a desktop, a workstation, etc.) or another type of networked device (such as, an industrial control system, etc.). In some examples, the user device 118 may be referred to as an "endpoint device." The LAN 102 includes a LAN device 106 (e.g., a wired and/or wireless router, etc.) that manages a connection between the user device 118 and a gateway device 108. The private network 104 includes a network appliance 110 (e.g., a network access control (NAC) device or a virtual private network (VPN) controller, a software defined perimeter (SDP) controller, etc.), an authentication server 112, a policy server 114 and one or more protected resources 116. The network appliance 110 controls access to the private network 104. In some examples, the network appliance 110 may be referred to as a "network appliance." The illustrated example includes one private network 104, but the network appliance 110 may control access to one or more private networks.

In general, the LAN 102 is remote relative to the private network 104. A user may operate the client 120 on the user device 118 to gain access to protected resources 116 of the private network 104. In order to access the protected resources 116, the client 120 may attempt to connect to a virtual local area network (VLAN) including devices and resources of private network 104. In particular, the client 120 may connect to the LAN device 106, which is communicatively coupled to gateway device 108. The gateway device 108 is a network switch, router, or other node that provides access to other network infrastructures, such as the Internet. The gateway device 108 passes, for example, Transmission Control Protocol/Internet Protocol (TCP/IP) network traffic between networks. In some examples, the various devices of the LAN 102 and the private network 104 may be interconnected via virtual private network (VPN) tunnels.

The gateway device 108 may perform two-way protocol conversions. For example, the gateway device 108 may convert network traffic exiting the LAN 102 that is formatted in a local area network protocol format, e.g., the IEEE 802.11 communication protocol, also called WiFi, or the IEEE 802.3 communication protocol, also called Ethernet, to a network communication protocol that is more suitable for the other portions of the private network 104, e.g., TCP/IP. The gateway device 108 may also convert network traffic received from regions of the private network 104 that is formatted in the TCP/IP network protocol to a network communication protocol that is suitable for the LAN 102.

The network appliance 110 intercepts requests to access to the private network 104 by devices such as the user device 118 or other network devices. On the first request in a predetermined time period (e.g., upon the first access request in a 24-hour period, etc.), the network appliance 110, in conjunction with the authorization server 112, authenticates the identity of the user of the user device 118 using user credentials (sometimes referred to as "authentication credentials") supplied by the client 120 (sometimes referred to as performing an "authentication check"). The authentication credentials include one or more of (i) a username and password that relate to a particular user of user device 118, (ii) a digital certificate, (iii) a cryptographic token, (iv) a biometric token, and/or (v) two-device authorization information, etc. In particular, the user must have previously established a user account on the private networks 104. In some examples, the network appliance 110 sends the authentication credentials to the authentication server 112 for authentication. In such examples, the authentication credentials are stored by authentication server 112 in order to gain access to private network 104. In some examples, the network appliance 110 sends the authentication credentials to the authentication server 112 for authentication.

When authentication is successful, the network appliance 110 may permit limited access to the private network 104 without providing access to the protected resources 116. For example, the limited access may only allow layer 2 (L2) in the OSI model access. Before providing access to the protected resources 116, the network appliance 110, via the policy server 114, enforces one or more policies (sometimes referred to as performing an "authorization check"). The policy server device 114 operates to enforce network access policies, such as minimum requirements for user authorization to access protected resources and minimum user device authentication requirements related to compliance with current polices of network system 100. For example, these policies may include requiring the user device 118 to have a proper operating system version, recent patches for the operating system or other software installed, an authorized antivirus program, and/or an authorized anti-spyware program, etc. In some examples, the network appliance 110 performs the authorization check before assigning the IP address to the user device 118 (e.g., as part of L2).

The policies are stored in a policy database 122. When an access request is received, the network appliance 110, via the policy server 114, queries the policy database 122 to retrieve policies that are applicable to the user device 118. The applicable policies are based on, for example, the role and/or clearance level of the user, the type of protected resources the user device 118 has access to, the time of day, the location of the LAN 102, and/or the type of the user device 118, etc. As described below, when the network appliance 110 determines that the user device 118 is compliant with the policies, the network appliance 110 grants access to the protected resources 116. During this evaluation, the network appliance 110 stores at least a portion of compliance data received from the client 118 into a compliance database 124. Additionally, as described further below, the network appliance 110 conducts a periodic authorization and/or authentication check of user device 118. For example, the network appliance 110 may perform authentication and authorization checks every time the user device 118 reconnects to the private network 104 and an authorization check every hour the user device 118 is connected to the private network 104. During these subsequent reauthorization checks, the network appliance 110 may use the compliance data stored in the compliance database 124.

In some examples, when the network appliance 110 determines that user device 118 is not compliant with the applicable policies, network appliance 110 sends remediate instructions to user device 118 as to how to comply with the current policies. The remediation instructions may direct user device 118 to a remediation server, which may form part of network appliance 110, or be a separate device (not shown). In general, user device 118 may receive data indicating how to come into compliance, e.g., by downloading one or more software tools, updating installed software and/or an installed operating system, or the like.

The network 100 includes the protected resources 116 stored on one or more network devices (not shown) connected to private network 104. The protected resources 116 may include a user email account, a file server for storing documents, an application server for sharing network-enabled versions of common software applications with many user devices, a network printer, a communications server for handling e-mail exchanges, fax communications, remote access to the network, firewalls and/or other internet services, a database server for storing data and for managing requests to store or access data, or the like, to which user device 118 or the user of user device 118 attempts to gain access.

While network 100 is described as a network including a plurality of network devices, in some examples, one or more of the devices shown in network 100 may be realized by a single network device, such as a network server or appliance operating software modules and/or divided into virtual networks by virtual network partitions that may each provide separate and/or shared network access control services, separate and/or shared policy management services, separate and/or shared data base services, and separate and/or shared protected resources.

Figure 2:
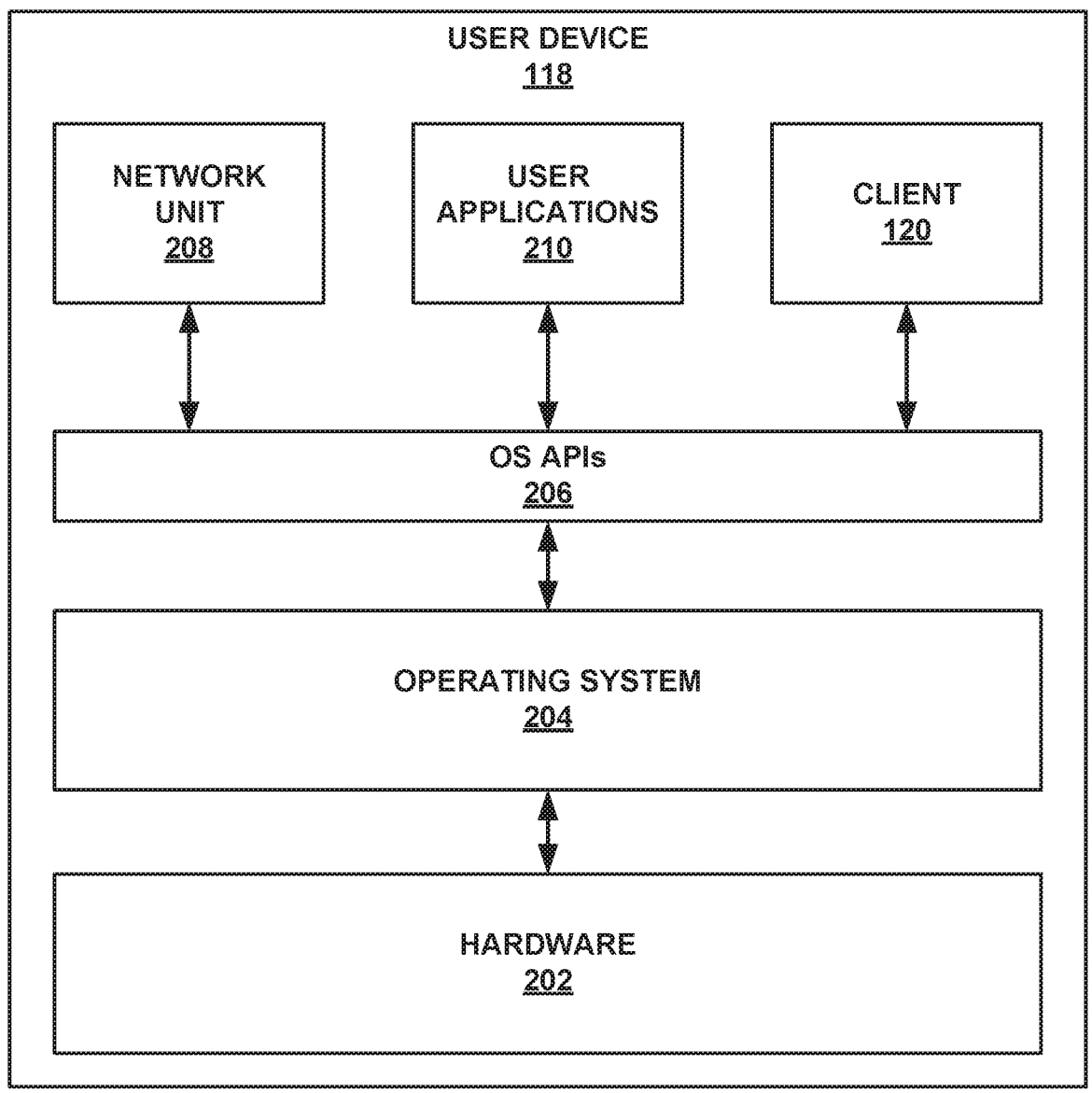
FIG. 2 is a block diagram illustrating an example user device according to the techniques of this disclosure.

FIG. 2 is a block diagram illustrating an example user device 118 operating in accordance with the techniques of this disclosure. User device 118 includes various software modules executed by a hardware 202. The hardware 202, for example, includes one or more processors and memory storing and executing instructions, touchscreens, speakers, microphones, cameras, etc. An operating system 204 and operating system (OS) application programming interfaces (APIs) 206 may be executed by the hardware 202. The operating system 204 controls device resources and manages various system level operations, while operating system APIs 206 provide interfaces between operating system 204 and various other components and software modules. The software modules of FIG. 2 include a network unit 208, user applications 210, and the client 120 (sometimes referred to as a "compliance agent").

The network unit 208 operates to communicate with an authenticator operating on a local area network controller (e.g., the LAN device 106 of FIG. 1). The network unit 208 includes, for example, an EAP/EAPOL authenticator are configured to communicate over a data-link layer (L2) communication channel to exchange authorization requests and authorization replies over the L2 communication channel. The network unit 208, in exchanges with the LAN device 106, provides authentication credentials, such as username/password or digital certificate, over the L2 communication channel. Thereafter, the network appliance 110 (e.g., via the authentication server device 112) determines whether the credentials are authentic. The network unit 208 may also include a DHCP client to (i) broadcast a DHCP request over L2 communication channel and (ii) receive IP address information provided by a DHCP server device (e.g., a DHCP server operating in the private network 104).

The user applications 210 are applications that provide utility to a user. The user applications 210 include, for example, an email client, a web browser, file system navigators, and/or anti-virus software.

As described below, the client 120 communicates with the network appliance 110 to assist the network appliance 110 in determining whether the user device 118 conforms to applicable policies (e.g., as determined by the policy server 114 of FIG. 1). The client 120 monitors the operating system 204 and/or the user applications 210. For example, the client 120 may monitor the versions of the OS 204 and/or the user applications 210, the settings of the user applications 210, and/or the presence and absence of user applications. After being authenticated by the network appliance 110, the client 120 requests access to the private network 104. In response, the client 120 either receives (a) a request for full compliance information (e.g., versions, settings, presence or absence of user applications 210, etc.) or (b) a request for updated compliance information. When the client 120 receives a request for full compliance information, the client 120 gathers the requested information, sends all of it in a response to the network appliance 110, and stores, in a compliance log 212 (e.g., in memory), the compliance request. Thereafter, the client 120 monitors and tracks the OS 204 and/or the user applications 210 based on the requested compliance information. When any of the compliance information changes, the client 120 records the change in the compliance log 212. When the client 120 receives a request for updated compliance information, the client 120 determines which items of the compliance information have changed since the last request based on the compliance log 212, and only sends a response with this changed compliance information.

Figure 3:
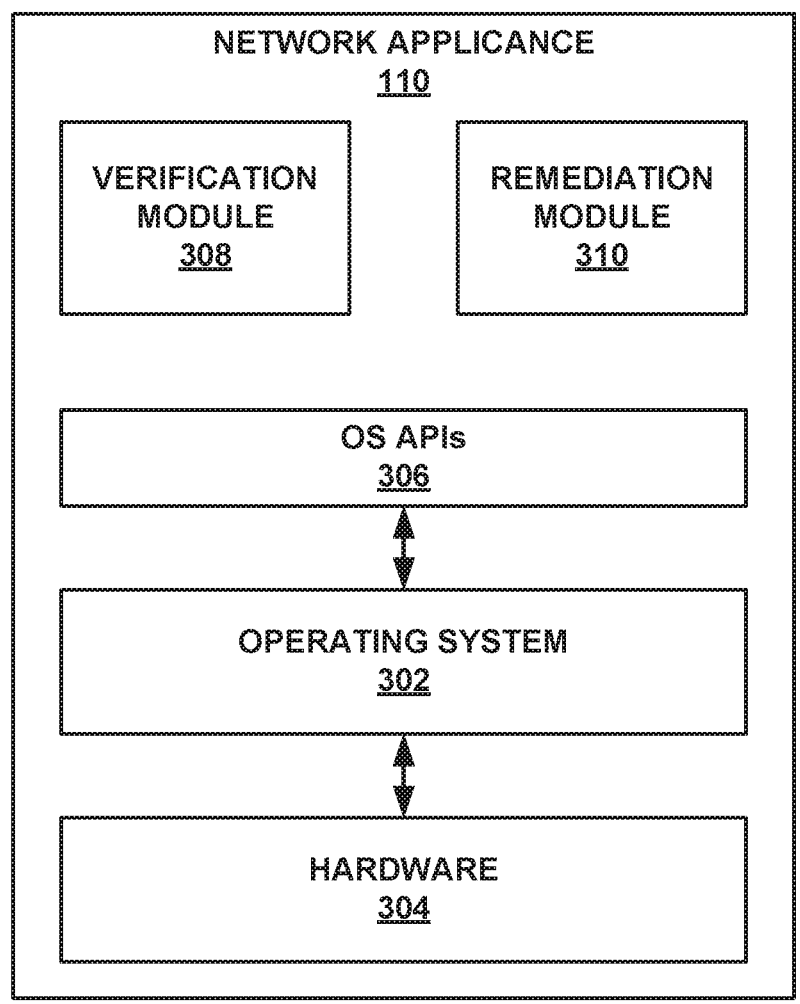
FIG. 3 is a block diagram illustrating an example network appliance according to the techniques of this disclosure.

FIG. 3 is a block diagram illustrating an example network appliance 110 according to the techniques of this disclosure. In the illustrated example, the network appliance 110 includes a device operating system 302 for controlling device resources 304 (e.g., processor(s), memory, network interfaces, etc.) and managing various system level operations, operating system APIs 306 used as interfaces between operating system 302 and various other applications, including a verification module 308, and a remediation module 310.

The verification module 308 communicates with user device 118 or with the client 120 operating on user device 118 to receive authentication credentials and compliance information from client 120. The verification module 308 performs an authentication check (e.g., in conjunction with the authentication server 112) using the authentication credentials and an authorization check (e.g., in conjunction with the policy server 114) using the compliance information. Initially, the user device 118 sends authentication credentials, which authentication server 112 authenticates, via, for example, an L2 channel. Subsequently, as described below, the verification module 308 determines whether the user device 118 is authorized to access one or more protected resources 116 in the private network 104. Based on the identity of the user and/or user device 118 (e.g., determined though the authentication check), the verification module 308, in conjunction with the policy server 114, determines whether the user device 118 is compliant with applicable policies.

When the user device 118 initially request access to the private network 104, the verification module 308 requests full compliance information. In some examples, the verification module 308 requests full compliance information periodically (e.g., every hour, every twelve hours, every day, etc.) from the user device 118 when the user device is connected to the private network 104. In some examples, the verification module 308 may be configured to erase the compliance information stored in the compliance database 124. In such examples, verification module 308 requests full compliance information when there is no compliance information in the compliance database 124 associated with the user device 118. In some example, the verification module 308 requests full compliance information when the user device 118 reconnects to the private network 104 after a threshold period of time (e.g., a day, etc.). The request for full compliance information specifies each piece of compliance data needed to evaluate the compliance of the user device 118. In response to the request for full compliance data, the verification module 308 receives responses for each of the pieces of compliance data. The verification module 308 uses this compliance data to determine whether the user device 118 is compliant with the applicable policies. The verification module 308 stores this compliance data in the compliance database 124 for future use.

From time-to-time (e.g., periodically, aperiodically, etc.), the verification module 308 requests updated compliance information from the user device 118. In some examples, the verification module 308 requests the updated compliance information periodically (e.g., every fifteen minutes, every hour, etc.) while the user device 118 is connected to the private network 104. For example, the verification module 308 may request full compliance data every six hours and updated compliance information every hour. In some example, the verification module 308 requests updated compliance information when the user device requests access to the private network 104 within a threshold period of time (e.g., fifteen minutes, etc.) after a disconnection. In some example, the request for updated compliance information includes a request, but does not enumerate each piece of compliance data needed to evaluate the compliance of the user device 118. In response to the request for full compliance data, the verification module 308 receives responses for pieces of compliance data that have changed (e.g., as determined by the client 120) since the most recent request for compliance information. The verification module 308 uses this compliance data along with compliance data stored in the compliance database 124, updating the changed compliance data, to determine whether the user device 118 is compliant with the applicable policies. The verification module 308 updates the compliance data in the compliance database 124 for future use.

Figure 4:
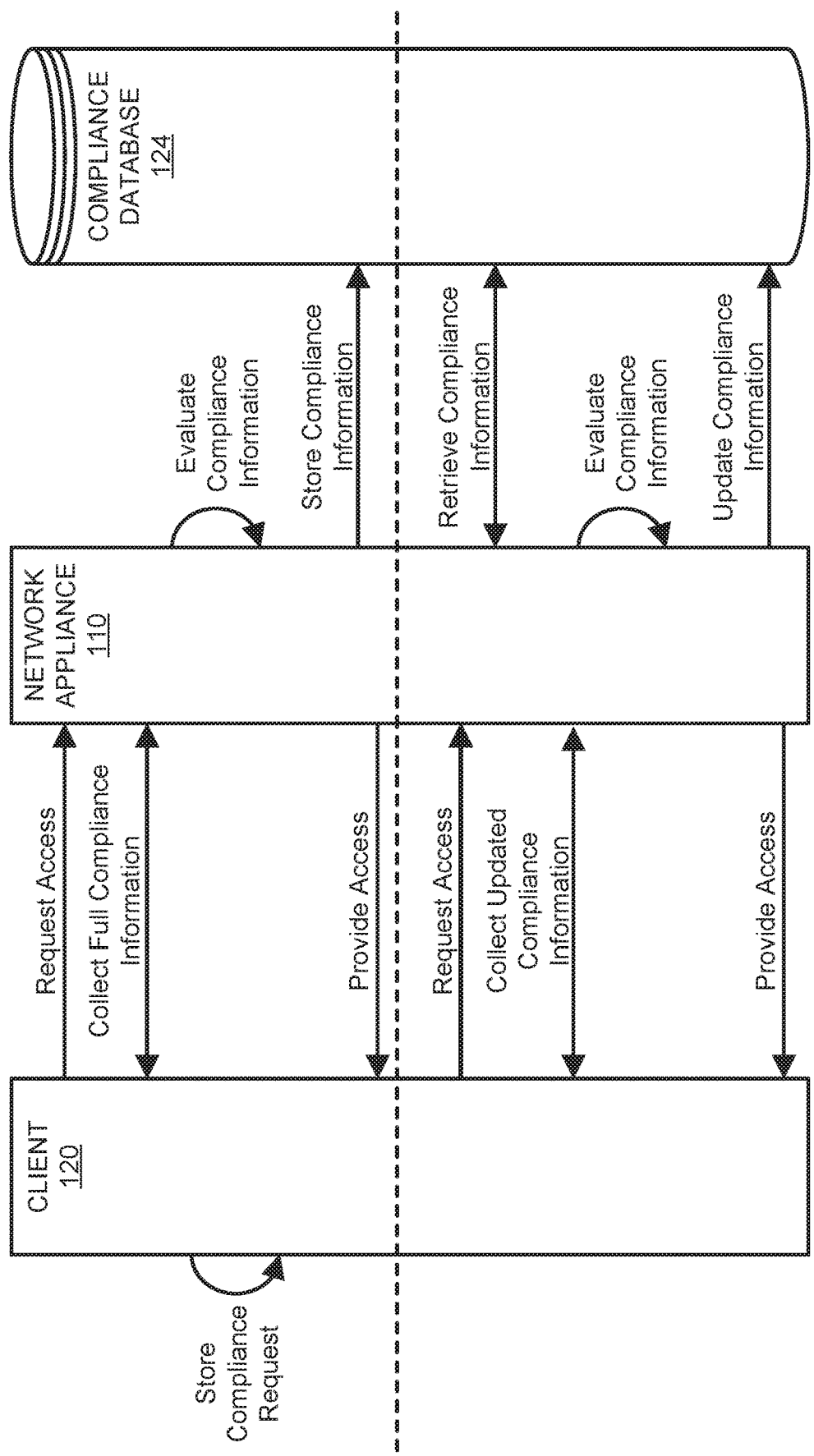
FIG. 4 is a block diagram of an example system for authorizing a user device to access one or more protected resources according to the techniques of this disclosure.

FIG. 4 is a block diagram of an example system for authorizing a user device 118 to access one or more protected resources 116 according to the techniques of this disclosure. Initially, the user device 118, via the client 120, sends a request to access the protected resources of the 116 of the private network 104. The network appliance 110 receives the access request. The network appliance 110 sends a request to collect compliance information to the client 120 when the network appliance 110 determines that a full compliance request is necessary. The network appliance 110 may determine that a full compliance request is necessary, for example, when there is incomplete compliance information associated with the device 118 in the compliance database 124, when this is the first compliance request received from the client 120, and/or when a predetermined time has elapsed since the most recent full compliance check. The data requested in the full compliance data is determine by the policy server 114 based on the identity of the user of the user device 118, the protected resources 116 that the user device 118 will access, the time of day, general policies of the private network 104, etc. In response to receiving a request for full compliance data, the client 120 returns the requested compliance information after gather the relevant data (e.g., anti-virus settings, OS version number, browser version, etc.) from the user device 118. The client 120 stores the compliance request and collected compliance information, and monitors the user device 118 for changes in the compliance information. The network appliance 110 evaluates the full compliance information provided by the client 120 against applicable policies. The network appliance 110 also stores the compliance data in the compliance database 124. When the compliance data satisfies the applicable policies, the network appliance 110 provides access to one or more of the protected resources 116 of the private network 104.

Subsequently, the client 120 requests access to access the protected resources of the 116 of the private network 104 again. Alternatively or additionally, in some examples, the network appliance 110 determines that the user device 118 should renew its access. In some examples, the network appliance 110 is configured to request updated compliance information periodically (e.g., every fifteen minutes, every thirty minutes, etc.). In response to the subsequent request, the network appliance 110 retrieves the compliance information stored in the compliance database 124 associated with the user device 118. The network appliance 110 also requests updated compliance information from the client 120. In some examples, the request for updated compliance information does not specify the particular compliance data being requested. Based on the compliance information stored previously that is being monitored by the client 120, the client 120 only sends compliance information to the network appliance 110 that has changed since the last request for compliance information. The network appliance 110 evaluates the user device 118 based on the updated compliance information and the compliance information retrieved form the compliance database 124. The network appliance 110 also updates the compliance data in the compliance database 124 with the updated compliance information received from the client 120. When the compliance data satisfies the applicable policies, the network appliance 110 provides access to one or more of the protected resources 116 of the private network 104.

Figure 5:
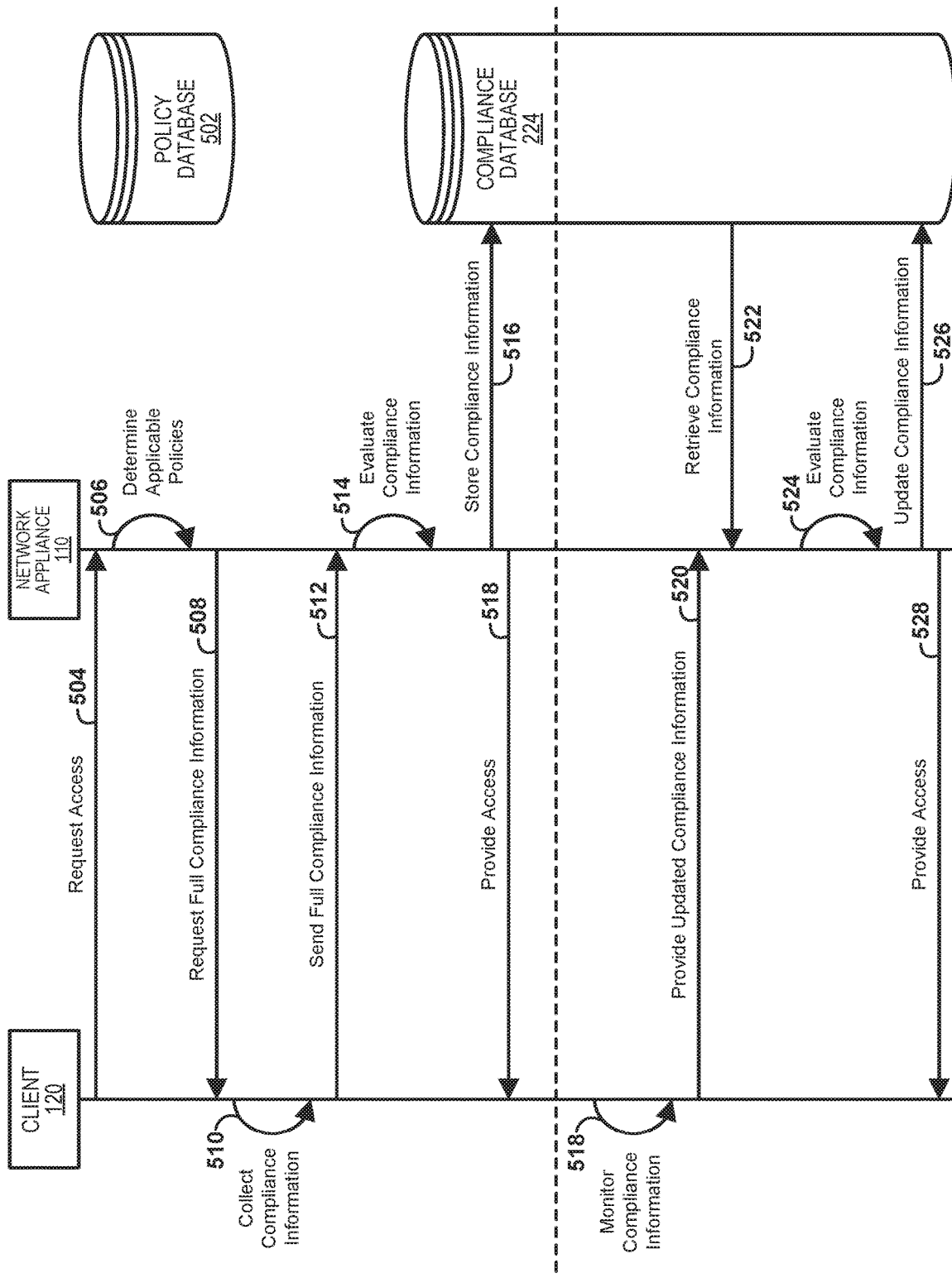
FIG. 5 is a diagram illustrating an example method for authorizing a user device to access one or more protected resources according to the techniques of this disclosure.

FIG. 5 is a diagram illustrating an example method for authorizing a user device 118 to access one or more protected resources 116 according to the techniques of this disclosure. Initially, the user device 118, via the client 120, sends a request to access the protected resources of the 116 of the private network 104 (504). The network appliance 110 receives the access request and determines the applicable policies for the user device 118 (506). In the illustrated example, the policies are stored in a policy database 502. The policies include characteristics that, when true, make the policy applicable and requirements to satisfy the policy. The characteristics, for example, may be based on the characteristics of the user (e.g., security clearance, job title, location, etc.) of the user device 118 (e.g., associated with the credential supplied during the authentication check), the protected resources 116 that the user device 118 will access, the time of day, general policies of the private network 104, etc. The network appliance 110 compiles the requirements and sends request for full compliance information to the client 120 that specifies the requirements (508). In response to receiving a request for full compliance data, the client 120 collects the requested compliance information from the user device 118 (510). The client 120 sends the collected compliance information to the network appliance 110 (512). The network appliance 110 evaluates the full compliance information provided by the client 120 against applicable policies (514). The network appliance 110 also stores the compliance data in the compliance database 124 (516). When the compliance data satisfies the applicable policies, the network appliance 110 provides access to one or more of the protected resources 116 of the private network 104 (518). In some examples, after a period of time, the network appliance 110 discards the compliant information stored in the compliance database 124.

Subsequently, the client 120 monitors the systems of the mobile device 118 to detect when any of the compliance information changes (518). The client 120 sends the changes (or updated) compliance information to the network appliance 110 (520). The client 120 does not include any compliance information that has not changed. In response to the updated compliance information, the network appliance 110 retrieves the compliance information stored in the compliance database 124 associated with the user device 118 (522). In some examples, when the compliance information does not exist within the compliance database 124 (e.g., it had been discarded), the network appliance 110 requests full compliance information instead (as at 508). The network appliance 110 evaluates the user device 118 based on the updated compliance information and the compliance information retrieved form the compliance database 124 (524). The network appliance 110 also updates the compliance data in the compliance database 124 with the updated compliance information received from the client 120 (526). When the compliance information satisfies the applicable policies, the network appliance 110 provides access to one or more of the protected resources 116 of the private network 104 based on, for example, as role assigned to the network device 118 (528). In some examples, when the compliance information does not satisfy the applicable policies, the network appliance 110 may still provide limited access to the private network 104.

Figure 6:
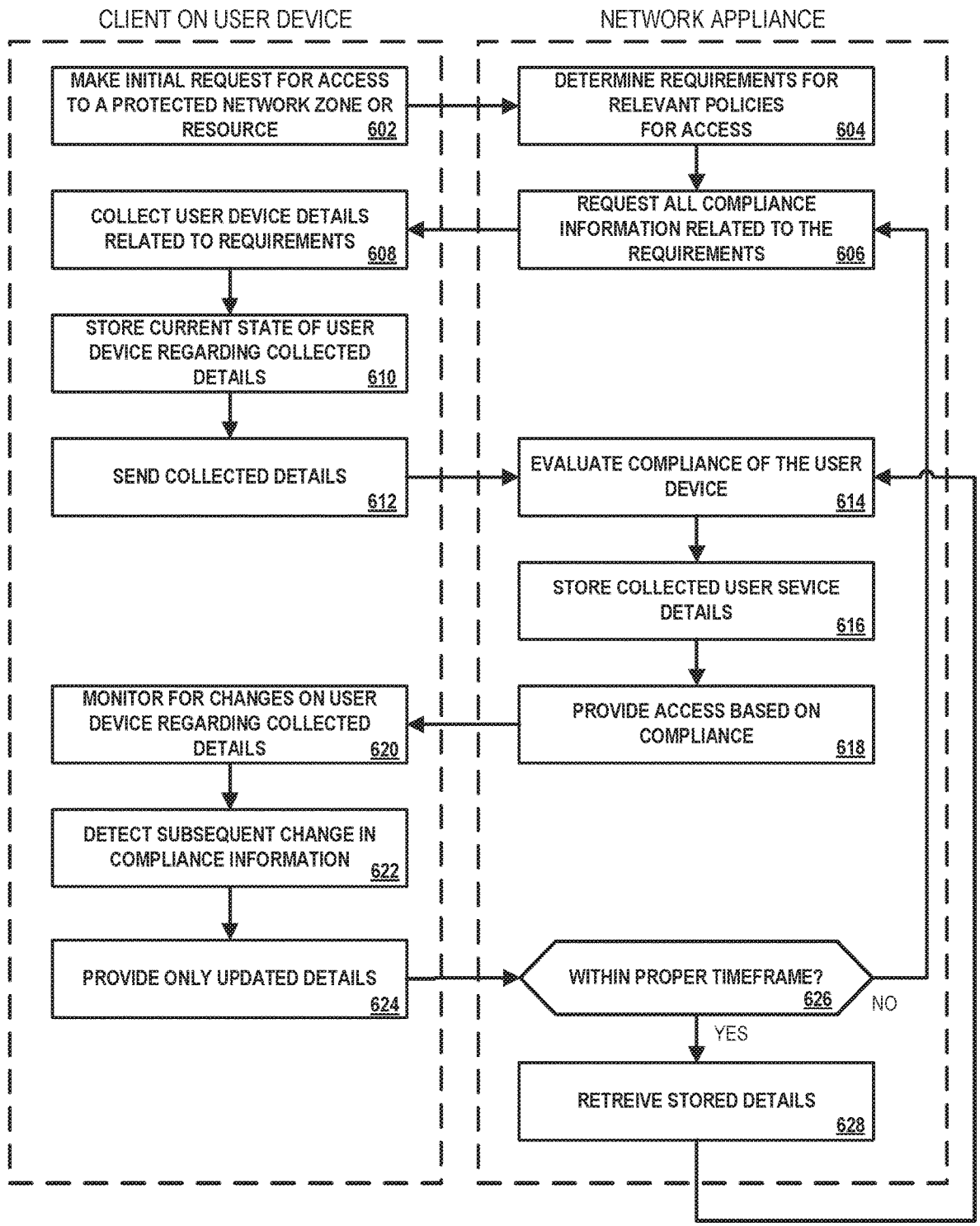
FIG. 6 is a flowchart illustrating an example method for authorizing a user device to access one or more protected resources according to the techniques of this disclosure.

FIG. 6 is a flowchart illustrating an example method for authorizing a user device 118 to access one or more protected resources 116 after being authorized to access the private network 104 according to the techniques of this disclosure. Initially, the client 120 makes an initial request for access to a protected network zone and/or protected resource 116 within the private network 104 (602). For example, the user device 118 may be connecting to the private network 104 for a first time or a threshold time period may have elapsed since the last request.

The network appliance 110 determines requirements for relevant policies for access (604). For example, the network appliance 110 may request policies from the policy server 114 applicable to the user device 118. For example, a policy may require that the user device 118 have a certain antivirus product, settings of the antivirus product, a certain firewall product, settings of the firewall product, a certain patch management product, settings of the patch management product, a certain status of an application (e.g., the application is open, etc.), a certain a file on the device, a certain status of one or more ports, and/or settings of registry keys, etc. The network appliance 110 requests all compliance information related to the identified requirements (606).

The client 120 collects user device details related to the requirements received from the network appliance 110 (608). Additionally, the client 120 stores the current state of the user device 118 related to the collected details (610). For example, if the compliance information requests the current version of an email client, the client 120 saves, in memory, the current version of the email client (i.e., the version of the email client that is sent to the network appliance 110). The client 120 sends the collected details (e.g., the requested compliance information) to the network appliance 110 (612).

The network appliance 110 evaluates the compliance (sometimes referred to as "evaluating the compliance state") of the user device 118 using the compliance information received from client 120 (614). For example, the network appliance 110 may compare the status of ports (e.g., opened or closed, etc.) included in the compliance information to the status of ports required by the corresponding policy. The network appliance 110 stores the received compliance data in the compliance database 124 (616). This stored compliance data is associated with the user device 118. The network appliance 110 provides access to the protected network zone and/or protected resources 114 of the private network 104 based on the compliance (e.g., based on the compliance state) of the user device 118 with the applicable policies (618). For example, if the user device 118 is compliant with all of the policies, the network appliance 110 may provide full access to the private network 104 that is afforded to the role assigned to the user device 118 (e.g., when the user device 118 is authenticated). As another example, if the user device 118 is partially compliant with the policies, the network appliance 110 may provide a limited form of access to the private network 104 that based on the role assigned to the user device 118 (e.g., when the user device 118 is authenticated).

The client 120 monitors for changes on the user device 118 related to the compliance information requested by the network appliance 110 (620). Subsequently, the client 120 detects that at least one setting related to the requested compliance information has changed on the user device 118 (622). Based on the updated compliance information, the client 120 provides only compliance information that has changed since the compliance information was last sent to the network appliance 110 (624).

The network appliance 110 determines whether the subsequent request in within a proper timeframe (626). For example, the network appliance 110 may be configured to define a threshold timeframe to be an hour. In such an example, if more than an hour has elapsed since the user device 118 was last connected to the private network 104, the network appliance 110 may determine that the updated compliance information is not within the proper timeframe. If the updated compliance information is not within a proper timeframe (NO at 626), the network appliance 110 requests all compliance information from the user device 118 (606). Otherwise, when the updated compliance information is within the proper timeframe (YES at 626), the network appliance 110 retrieves the stored compliance information from the compliance database 124 (628). The network appliance 110 proceeds determine whether the user device 118 is compliant with the applicable policies (614). As a result of the updated compliance information, the network appliance 110 may adjusts the access level of the user device 118.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method, comprising:
   in response to receiving, by a network appliance, a first request to access a protected network resource from an endpoint device, wherein the endpoint device is assigned a role and includes a client software module configured to communicate with the network appliance:
   determining, by the network appliance, which compliance information related to policies is associated with access of the protected network resource by the endpoint device having the assigned role;
   requesting, by the network appliance, all of the determined compliance information from the client software module;
   evaluating, by the network appliance, the compliance of the endpoint device based on the compliance information received from the client software module to determine a compliance state and providing access based on the compliance state;
   storing, by the network appliance, the received compliance information in a database associated with the network appliance;
   in response to receiving, by the network appliance, first updated compliance information that includes only updated ones of the compliance information required by the policies, evaluating, by the network appliance, the compliance of the endpoint device based on the updated compliance information and the compliance information stored in the database to determine an updated compliance state;
   providing, by the network appliance, access to the protected network resource to the endpoint device based on the updated compliance state; and
   after a first time period, deleting the compliance information stored in the database,
   wherein the compliance information includes at least one of an identity of an antivirus product, settings of the antivirus product, an identity of a firewall product, settings of the firewall product, an identity of a patch management product, settings of the patch management product, a status of an application, a presence of a file on the device, a status of one or more ports, or settings of registry keys.

2. The method of claim 1, further comprising, in response to receiving, by the network appliance, second updated compliance information from the endpoint device, when a threshold period of time has passed since the first request, requesting all of the determined compliance information from the client software module.

3. The method of claim 1, further comprising, in response to receiving, by the network appliance, a second request to access the protected network resource from the endpoint device, when a threshold period of time has not elapsed since the first request, requesting the updated compliance information from the client software module.

4. The method of claim 1, further comprising, after a first threshold period of time has elapsed, requesting the updated compliance information from the client software module.

5. The method of claim 4, further comprising after a second threshold period of time has elapsed, requesting all of the determined compliance information from the client software module, the second threshold period of time being after the first threshold period of time.

6. The method of claim 1, further comprising, storing, by the network appliance, the first updated compliance information.

7. The method of claim 6, further comprising deleting, after the first time period, the first updated compliance information stored in the database.

8. The method of claim 7, further comprising in response to receiving, by the network appliance, a third request to access the protected network resource from the endpoint device after the first time period, requesting all of the determined compliance information from the client software module.

9. A network appliance configured to enforce one or more policies for accessing a protected network resource on a private network, the network appliance comprising:
- at least one hardware processor; and
- a non-transitory computer-readable medium having encoded therein programming code executable by the at least one hardware processor to perform or control performance of operations in response to receiving a first request to access the protected network resource from an endpoint device having an assigned role and including a client software module configured to communicate with the network appliance, the operations comprising:
  - determine, using a policy database, which compliance information related to policies is associated access of the protected network resource by the endpoint device having the assigned role;
  - request all of the determined compliance information from the client software module;
  - evaluate the compliance of the endpoint device based on the compliance information received from the client software module to determine a first compliance state and provide access based on the compliance state;
  - store the received compliance information in a database associated with the network appliance;
  - in response to receiving first updated compliance information that includes only updated ones of the compliance information required by the policies, evaluate the compliance of the endpoint device based on the updated compliance information and the compliance information stored in the database to determine an updated compliance state;
  - provide access to the protected network resource to the endpoint device based on the updated compliance state; and
  - after a first time period, deleting the compliance information stored in the database,
  - wherein the compliance information includes at least one of an identity of an antivirus product, settings of the antivirus product, an identity of a firewall product, settings of the firewall product, an identity of a patch management product, settings of the patch management product, a status of an application, a presence of a file on the device, a status of one or more ports, or settings of registry keys.

10. The network appliance of claim 9, further comprising, in response to receiving, by the network appliance, second updated compliance information from the endpoint device, when a threshold period of time has passed since the first request, the network appliance is configured to request all of the determined compliance information from the client software module.

11. The network appliance of claim 9, further comprising, in response to receiving, by the network appliance, a third request to access the protected network resource from the endpoint device, when a threshold period of time has not elapsed since the first request, requesting the updated compliance information from the client software module.

12. The network appliance of claim 9, further comprising, after a first threshold period of time has elapsed, requesting the updated compliance information from the client software module.

13. The network appliance of claim 12, further comprising after a second threshold period of time has elapsed, requesting all of the determined compliance information from the client software module, the second threshold period of time being after the first threshold period of time.

14. The network appliance of claim 9, further comprising in response to receiving, by the network appliance, a third request to access the protected network resource from the endpoint device after the first time period, requesting all of the determined compliance information from the client software module.

15. A method, comprising:
- in response to receiving, by a network appliance, a request to access a protected network resource from an endpoint device that includes a client software module configured to communicate with the network appliance:
  - determining, by the network appliance, whether a compliance database includes compliance information associated with the endpoint device;
  - in response to the compliance database not including the compliance information associated with the endpoint device:
    - determining, by the network appliance, which of the compliance information related to policies associated with access of the protected network resource by the endpoint device based on the protected network resource and a role assigned to the endpoint device; and
    - requesting, by the network appliance, all of the determined compliance information from the client software module;
  - in response to the compliance database including the compliance information associated with the endpoint device, accessing, by the network appliance, the compliance information of the endpoint device stored in the database and requesting an update from the endpoint device;
  - evaluating, by the network appliance, the compliance of the endpoint device based on the compliance information to determine a compliance state;
  - providing, by the network appliance, access to the protected network resource to the endpoint device based on the compliance state; and
  - deleting, after a first time period, the compliance information stored in the compliance database,
  - wherein the compliance information includes at least one of an identity of an antivirus product, settings of the antivirus product, an identity of a firewall product, settings of the firewall product, an identity of a patch management product, settings of the patch management product, a status of an application, a presence of a file on the device, a status of one or more ports, or settings of registry keys.

16. The method of claim 15, further comprising, in response to requesting the update from the endpoint device, receiving less than all of the required compliance information from the client software module.

17. The method of claim 16, further comprising, updating the compliance database with the compliance information received in response to the update request.

\* \* \* \* \*